United States Patent
Nielson

[11] Patent Number: 5,935,176
[45] Date of Patent: Aug. 10, 1999

[54] MOMENTUM WHEEL OSCILLATION FILTER

[75] Inventor: Marlin C. Nielson, Boulder, Colo.

[73] Assignee: Lockheed Martin Corporation, Bethesda, Md.

[21] Appl. No.: 08/754,825

[22] Filed: Nov. 22, 1996

[51] Int. Cl.$^6$ .................................................. B64G 1/28
[52] U.S. Cl. ............................ 701/4; 701/13; 701/226; 244/164; 244/165
[58] Field of Search .................................. 701/13, 14, 4, 701/3, 5, 7, 38, 39, 40, 226; 244/169, 164, 166, 173, 165, 167, 171, 170

[56] References Cited

U.S. PATENT DOCUMENTS

| | | | |
|---|---|---|---|
| 3,866,025 | 2/1975 | Cavanagh | 701/13 |
| 3,925,643 | 12/1975 | Roantree et al. | 701/205 |
| 3,937,423 | 2/1976 | Johansen | 244/3.22 |
| 4,084,772 | 4/1978 | Muhlfelder | 244/165 |
| 4,092,716 | 5/1978 | Berg et al. | 701/3 |
| 4,230,294 | 10/1980 | Pistiner | 244/170 |
| 4,294,420 | 10/1981 | Broquet | 244/165 |
| 4,521,855 | 6/1985 | Lehner et al. | 701/13 |
| 4,567,564 | 1/1986 | Bittner et al. | 701/4 |
| 4,786,018 | 11/1988 | Cope | 244/164 |
| 4,911,385 | 3/1990 | Agrawal et al. | 244/165 |
| 4,931,942 | 6/1990 | Carg et al. | 701/226 |
| 5,020,745 | 6/1991 | Stetson, Jr. | 244/165 |
| 5,058,835 | 10/1991 | Goodzeit et al. | 244/165 |
| 5,184,790 | 2/1993 | Fowell | 244/165 |
| 5,248,118 | 9/1993 | Cohen et al. | 244/164 |
| 5,259,577 | 11/1993 | Achkar et al. | 244/164 |
| 5,269,483 | 12/1993 | Flament | 244/164 |
| 5,308,024 | 5/1994 | Stetson, Jr. | 244/165 |
| 5,343,398 | 8/1994 | Goodzeit et al. | 701/13 |
| 5,540,405 | 7/1996 | Bender et al. | 244/166 |
| 5,608,634 | 3/1997 | Goodzeit et al. | 701/4 |
| 5,610,820 | 3/1997 | Shankar et al. | 701/13 |

*Primary Examiner*—Jacques H. Louis-Jacques
*Attorney, Agent, or Firm*—Carl M. Wright

[57] ABSTRACT

Momentum wheel speed correction in an orbital space vehicle that corrects for the oscillation resulting from spurious variations in the angular velocity of the momentum wheel. The momentum wheel's angular velocity is subject to random fluctuations due to Coulomb forces. These fluctuations are coupled into the vehicle's spin rate causing errors in the yaw rate and yaw. By adding corrective values to the determined yaw rate and yaw by selectively filtering the momentum wheel tachometer signals, pointing errors are substantially reduced or even eliminated.

10 Claims, 4 Drawing Sheets

MOMENTUM WHEEL OSCILLATION FILTER

DOCUMENTS INCORPORATED BY REFERENCE

This application is related to U.S. patent application Ser. No. 08/725,433 filed on Oct. 3, 1996, now U.S. Pat. No. 5,852,792 by the same inventor and assigned to the same entity as the present application.

BACKGROUND AND SUMMARY OF THE INVENTION

This invention relates generally to correcting pointing errors in satellite data and particularly to correction of errors caused by a satellite's momentum wheel oscillations which are coupled into the satellite spin rate.

Many earth-orbiting satellites, such as surveillance and communication satellites, must be oriented so as to point to the earth. In general, the z-axis of the satellite is maintained so as to line up with the center of the earth. In addition, a surveillance satellite rotates about its z-axis so that a sensor array can detect targets, usually those on or near the earth's surface.

A satellite, however, tends to maintain its orientation in space and rotational forces are required to change its direction to keep it pointing toward the earth. Such rotational forces can include positioning impulse jets which are pulsed occasionally so as to keep the satellite's z-axis pointing to the earth. There are also reaction or momentum wheel and magnetic dipole generators for changing the satellites attitude with respect to the earth or other body about which they orbit.

The action of the impulse jets (or other forces) cause a change in the angular momentum of the satellite and a time rate of change of angular momentum creates a torque, i.e., a force moment that acts on the satellite, causing it to rotate about a third axis. The third axis rotation, called precession, is a result of the angular momentum of the satellite spin and the torque resulting from the force of the positioning jets. For example, with the satellite spinning about its z-axis and the positioning jets rotating the satellite about its y-axis, the precession torque causes the satellite also to rotate about its x-axis. Precession acts to prevent a spinning body from being moved relative to only one of its axes. The motion is, in other words, the positioning rotation is translated by 90° in the direction of the satellite rotation. Vectorially, precession is the cross-product of the satellite's spin and the correcting force.

To reduce or to eliminate precession, the angular momentum of the satellite rotating about its z-axis is cancelled by an on-board momentum wheel having its axis of rotation coincident with the satellite's z-axis but rotating in the opposite direction. The momentum wheel's angular velocity is ideally constant as is the satellite spin rate. External forces, however, tend to slow the satellite spin which is restored, for example, by jet thrusters.

Coulomb forces, principally random frictional drag in the bearings, causes changes in the angular velocity of the momentum wheel. The changes are detected by a tachometer coupled to the momentum wheel's shaft. A control system uses the tachometer input signal to regulate the momentum wheel velocity.

The result is spurious oscillations being superimposed on the satellite spin rate. These disturbances must be corrected to preclude satellite pointing errors. The corrections are the subject of the present invention.

Prior art references are directed to attitude control and compensation. For example, U.S. Pat. No. 5,020,745 is directed to reducing attitude errors in a spacecraft using reaction wheels when the reaction wheel's direction of rotation is reversed. (Reaction wheels in the literature refer to those rotating masses which provide control by rotating in either direction whereas momentum wheels are those rotating masses which rotate in the same direction, providing control in some instances by varying the speed of rotation.) Attitude errors are introduced as the reaction wheel comes to rest and the direction of rotation is reversed.

U.S. Pat. No. 3,937,423 is directed to three-axes attitude control using one rotatable momentum wheel in one degree of freedom and jet thrustors in the degrees of freedom.

U.S. Pat. No. 5,058,835 is a system using four reactor wheels for attitude control and develops integrated vector errors to added to the attitude control torque commands.

U.S. Pat. No. 5,428,118 describes a momentum wheel having a rotational speed kept above a threshold value to insure proper lubrication. The problems of proper lubrication of a momentum wheel's bearings is explained.

U.S. Pat. No. 5,308,024 describes attitude control with disturbance torque compensation for stabilizing three-axis, zero-momentum satellites such as communication satellites which normally do not rotate but are earth-facing.

U.S. Pat. No. 4,567,564 is directed to attitude in stabilization in flexible space vehicles. It utilizes an observer (Kalman Filter) and a state controller to correct for weakly-damped bending vibrations of the vehicle.

U.S. Pat. No. 5,269,483 uses two loops—a fast loop and a slow loop—for attitude control.

U.S. Pat. No. 4,521,855 also uses a fast control loop and a slow control loop for continuous yaw correction with three momentum wheels.

U.S. Pat. No. 4,786,018 uses attitude variation signals applied to a Kalman Filter which supplies actuator control signals with feedback to a modeling circuit.

U.S. Pat. No. 5,259,577 uses a polar star sensor and a momentum wheel along the pitch axis with magnetic dipole generators in the roll and yaw planes.

While these prior art references are suited to the purpose for which they are intended and provide some valuable background about the problems of satellite attitude correction and control, they address the correction of pointing errors only in an indirect manner. They do not suggest the present approach to correcting the more subtle pointing errors introduced by the effect of Coulomb forces on the speed of a momentum wheel.

In accordance with the invention, a spacecraft having momentum wheel includes follower means to indicate the motion of the momentum wheel. An observer responds to signals from the spacecraft to supply calculated yaw rate and yaw values of the spacecraft. A detector responsive to the follower means supplies values of variations in the rate of rotation of the momentum wheel and the values of the variations are applied from the detector means to the observer means to correct the calculated spacecraft yaw rate.

The utility of the invention is corrections of errors in the determined spin rate of a space vehicle and resulting pointing errors caused by undesirable perturbations in the angular velocity of an on-board momentum wheel.

BRIEF DESCRIPTION OF THE DRAWING

The invention is described in detail by referring to the various figures which illustrate specific embodiments of the invention, and wherein like numerals refer to like elements.

Figure 1:
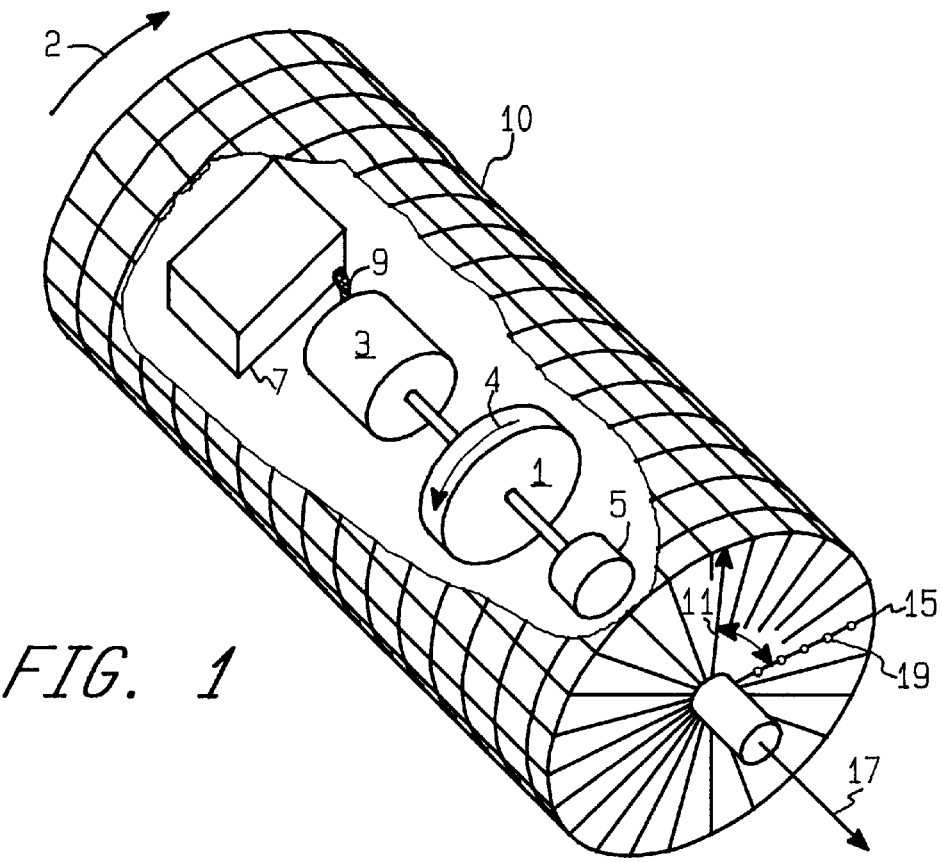
FIG. 1 is a diagram showing the momentum wheel system that is part of a satellite on-board systems.

DETAILED DESCRIPTION
SYMBOLS AND DEFINITIONS

The following symbols and definitions are used in the detailed description of the preferred embodiment.

F=Force.

m=mass.

a=acceleration=F/m.

r=crank length, the distance from a body's axis of rotation to an orthogonal direction of force.

α=angular acceleration=a/r.

J=moment of inertia=$mr^2$. (Often I in the literature.)

T=torque=Fr=ma×r=$mr^2$α=αJ.

L=angular momentum=ωJ.

ω=angular velocity=∫αdt.

$\theta_s$=yaw (see below).

$$\psi = \text{yaw rate} = \frac{d\theta_s}{dt} = \omega_s.$$

Geographical position is the point on the earth's surface where a straight line from the center of the earth to a celestial body (including an orbiting spacecraft) intersects the earth's surface.

Geographical intersect is the point on the earth's surface where a straight line vector intersects the earth's surface.

Yaw is the angle between a reference radius of a spinning body and an index radius of the spinning body.

Yaw rate is the change of yaw with respect to time and is equal to the spin rate (angular velocity) of the body.

OVERVIEW OF THE INVENTION

An accurate determination of the attitude of an orbiting satellite is important for precise mapping of detected targets in the case of surveillance space vehicles and for exact directing of antenna equipment in the case of communication satellites. Using window predictions, the satellite's attitude state vector is computed from observation data of known detectable objects.

The attitude state vector can be denoted as $$\begin{pmatrix} \theta_y \\ \theta_x \\ \theta_z \\ \omega_y \\ \omega_x \\ \omega_z \end{pmatrix}$$

where $\theta_y$, $\theta_x$, and $\theta_z$ represent the satellite's pitch, roll, and yaw, respectively. The values $\omega_y$, $\omega_x$, and $\omega_z$ are the pitch rate, roll rate, and yaw rate, respectively, and are related to the pitch, roll, and yaw as $$\omega_y = \frac{d\theta_y}{dt}, \ \omega_x = \frac{d\theta_x}{dt}, \text{ and } \omega_z = \frac{d\theta_z}{dt}.$$

The attitude state vector can be improved by use of a Kalman Filter to process the vector based on present observations and previous vector values. Details of such an application of Kalman Filters is described in detail in patent application <Docket No. LF995011>, referenced above as related to the present application, as applied to boresight state vectors.

The present invention relates to errors that occur in a subset of the satellite's attitude state vector, viz., $$\begin{pmatrix} \theta_z \\ \omega_z \end{pmatrix},$$

the yaw and yaw rate. In the following description, it will be denoted by replacing the subscript z with s, i.e., $$\begin{pmatrix} \theta_s \\ \omega_s \end{pmatrix}.$$

A momentum wheel is used in satellites to counteract inertial forces such as precession which result from applying torques to keep the satellite directed toward the earth. The momentum wheel rotates in direction opposite from the direction of the satellites yaw rate or spin. It rotates at a speed such that it's angular momentum is equal to but opposite that of the satellite's angular momentum.

Ideally, the momentum can be maintained at a constant angular velocity. Realistically, however, Coulomb forces such as bearing friction cause variations in its angular velocity. This in turn causes variations in the angular velocity of the satellite which are not corrected in the prior art.

Summarizing the problem to be solved, momentum wheel variations are coupled into the spin rate of the satellite, resulting in errors in the determined yaw rate and yaw. These errors cause errors in the satellite attitude which in turn produce errors in the location of the images being detected by the satellite.

The invention selectively filters signals returned by the momentum wheel tachometer to supply corrective values to the determined yaw rate and yaw.

PREFERRED EMBODIMENT

In FIG. 1, an orbiting spacecraft 10 is shown with a reference radius 11 and an index radius 15. An angle, Ψ, hereinafter called yaw, is measured from the reference radius 11 and the index radius 15. The index radius is considered to be a line along which an array of sensors is located in the spacecraft 10. As the spacecraft 10 rotates, the sensors scan the orbited body, e.g., the earth, and transmit the resulting signals to one or more ground stations for purposes of mapping the scanned image. In some cases, the image signals may be temporarily stored before transmission to the ground signals.

The spacecraft orientation is such that the line or array of sensors, i.e., the index radius, rotates about the z-axis of the spacecraft. In FIG. 1, the z-axis is represented by a vector 17. To locate the geographical intercept of the z-axis vector 17 accurately—and therefore accurately locate points on the mapping image—signals are transmitted from the spacecraft to the ground stations in addition to the image signals that enable the ground stations to determine the geographical intercept of the z-axis vector 17.

In FIG. 1, a momentum wheel system for controlling the attitude of the spacecraft relative to the z-axis is shown, not to scale. The principal components are the momentum wheel 1 which is driven by a motor 3. The motor 3 is controlled by a controller 7 which receives signals from a tachometer 5. The momentum wheel rotates in a direction 4 opposite to the spin direction 2 of the spacecraft about the z-axis.

The net momentum about the z-axis is $$L_z = J_{sz}\omega_s(t) - J_r\omega_r(t) \tag{1}$$

where $J_{sz}$ is the satellite moment of inertia about the z-axis, $\omega_s(t)$ is the time-varying angular velocity about the z-axis (the yaw rate), $J_r$ is the momentum wheel moment of inertia, and $\omega_r(t)$ is the time-varying angular velocity of the momentum wheel.

Since $L_z$ is desired to be as close to zero as possible, the two angular momentums should be as equal as possible. That is, $J_{sz}\omega_s(t) \approx J_r\omega_r(t)$. Since the mass of the momentum wheel is considerably less than that of the satellite, its angular velocity, $\omega_r$, must be considerably greater than the yaw rate, $\omega_s$. Even though designed to run at a constant speed, the angular velocity of the momentum wheel has random disturbances caused by Coulomb forces, principally from varying friction in the bearings of the momentum wheel system. The disturbances are coupled into the yaw rate of the satellite and should be taken into account to make the surveillance data as accurate as possible.

The data from the sensors is transmitted via a ground link, to a base station where the data is processed. The data is passed through a Kalman Filter to determine the yaw rate, $\omega_s$, and the yaw, $\int \omega_s$. The Kalman Filter has been used to follow variations in $\omega_s$ by a computer modeling procedure called an "integrated random walk". This permits adequate performance but for satellites having a larger time-varying term, it must be corrected for to maintain accuracy.

Figure 2:
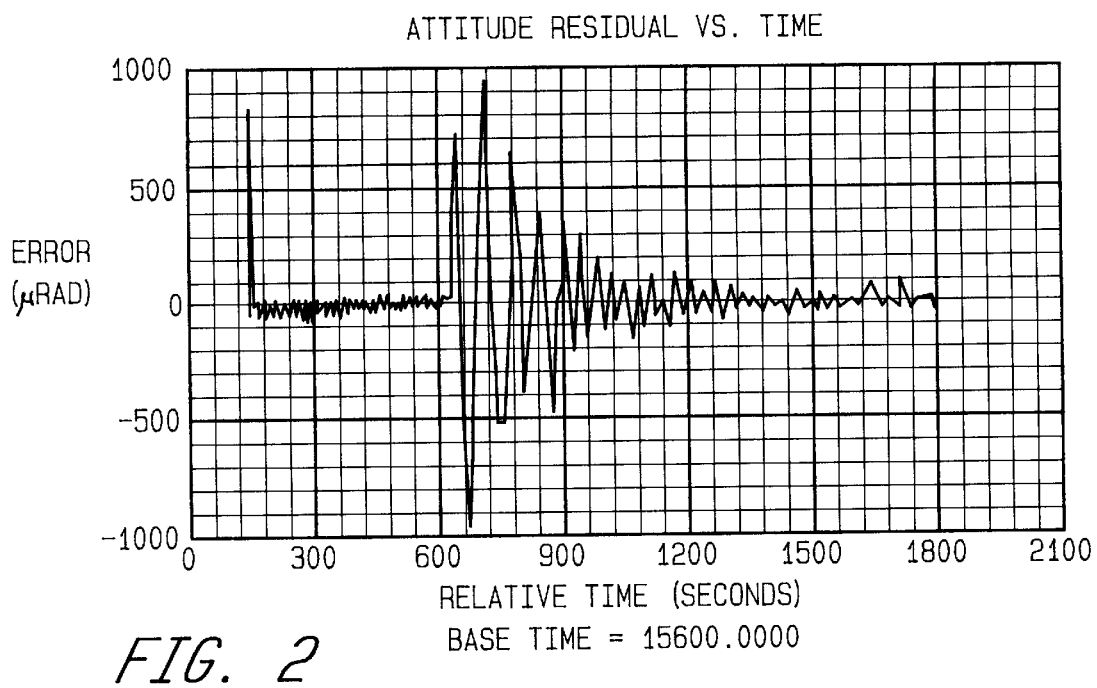
FIG. 2 is a graphical representation of attitude yaw residual showing an example of the error in satellite yaw with respect to time.

FIG. 2 is an example of the residual from the Kalman attitude filter and is a measure of the error in yaw with respect to time. Ideally, such residuals should be random, Gaussian white noise. but FIG. 2 shows that there is at times a large sinusoidal component which is caused by unmodeled disturbances. An increase in the process noise in the Kalman Filter random walk would also reduce the sinusoidal disturbance but would result in an increase in random noise.

The present invention, however, obtains superior results by modelling the cause of the yaw rate variations. First, the following explanation will first model the momentum wheel rate variations. Next, a filter to compensate for the variations will be developed.

Figure 3:
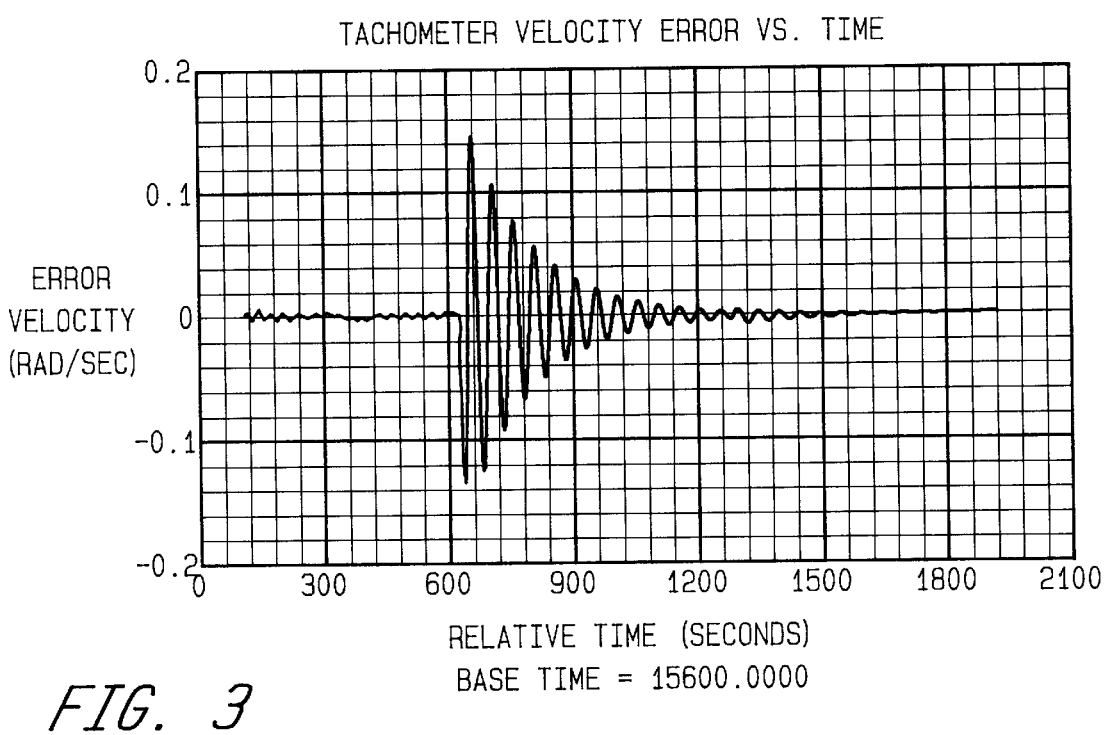
FIG. 3 is a graphical representation of momentum wheel angular velocity error.

FIG. 3 is a plot of the momentum wheel velocity error with respect to time for the same period as the residual signal shown in FIG. 2. The correlation between the two plots is readily apparent. The momentum wheel angular velocity, $\omega_r(t)$, can be expanded into its dominant Fourier components as $$\omega_r(t) = \omega_{r0} + \omega_{r1} \sin(2\pi f_1 t).$$

If $\omega_{r1}$ varies with respect to time in a manner such that it has frequency components much smaller than $f_1$ and $f_1$ is allowed to vary with respect to time, the equation can be rewritten as $$\omega_r(t) = \omega_{r0} + \omega_{r1}(t) \sin(2\pi f_1(t)t) \tag{2}$$

This is an amplitude modulation and creates sidebands about $f_1$.

Figure 4:
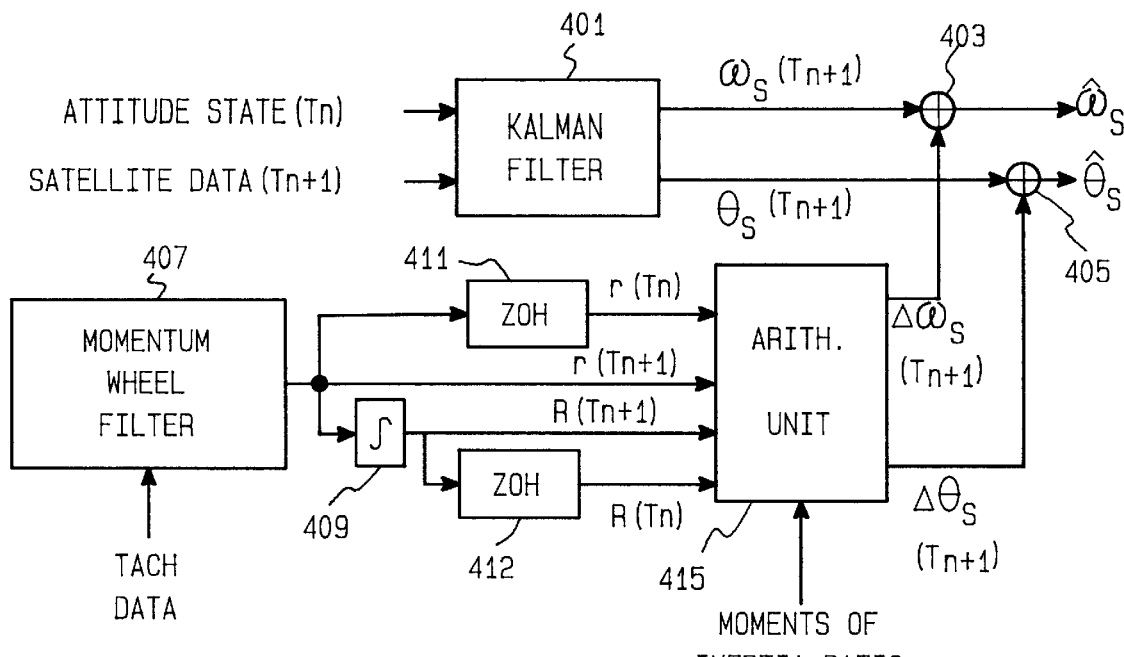
FIG. 4 is a block diagram of a correction system according to the invention.

A block diagram of the invention is shown in FIG. 4. A Kalman Filter 401 receives satellite data to produce an attitude state vector, $$\begin{bmatrix} \omega_s \\ \theta_s \end{bmatrix}$$

where $\omega_s$ is the yaw rate and $\theta_s$ is the yaw. This is an existing process used in many satellite systems. The attitude state vector, however, contains errors due to the variations in the angular speed of the momentum wheel.

The corrections to the attitude state vector, the subject matter of this invention, are added to the elements of the attitude state vector by two summers 403 and 405.

The corrections $\Delta\omega_s(T_{n+1})$ and $\Delta\theta(T_{n+1})$ are furnished as follows. The tachometer pulses (tach data) is coupled into a momentum wheel filter 407 (described in detail below) to produce a signal $r(T_{n+1})$. This is a rate value. It is integrated by an integrator 409 to produce a signal $R(T_{n+1})$ sample value taken at the n+1-th time period.

Two zero-order hold circuits 411 and 412 store the values from the previous time period sample, $r(T_n)$ and $R(T_n)$ respectively. These values are supplied to an arithmetic unit 415 having as output signals the correction values $\Delta\omega_s(T_{n+1})$ and $\Delta\theta_s(T_{n+1})$. These correction signals are coupled to the summers 403 and 405 to furnish the corrected yaw rate and yaw signals, $\hat{\omega}_s$ and $\hat{\theta}_s$, respectively.

The description of the correction process will begin with an explanation of the models on which it is based.

SATELLITE YAW RATE MODEL

The yaw rate model will be modified to compensate for the variations in the momentum wheel angular velocity. The instantaneous values of the time-varying portions of the momentum wheel position and velocity can be measured in a manner to be explained below.

Substituting equation (2) into equation (1) omitting the (t) suffix from $\omega_{r1}$ and from $f_1$ (although they will still be considered to vary with time), $J_{sz}\omega_s(t) = J_r[\omega_{r0} + \omega_{r1} \sin(2\pi f_1 t)]$ and dividing by the satellite's moment of inertia, $$\omega_s(t) = \frac{J_r}{J_{sz}}\omega_{r0} + \frac{J_r}{J_{sz}}\omega_{r1}\sin(2\pi f_1 t).$$

Since $J_r/J_{sz}\omega_{r0}$ is the substantially constant yaw rate, $\omega_s(t) = \omega_{s0}$ measured by the Kalman Filter, the yaw rate model is $$\omega_s(t) = \omega_{s0} + \frac{J_r}{J_{sz}}\omega_{r1}\sin(2\pi f_1 t) \tag{3}$$

A value $r(t) = \omega_{r1}\sin(2\pi f_1 t)$ will be derived by an appropriate momentum wheel filter in accordance with the invention as explained below in detail. If the filter closely approximates the yaw rate error component, $\omega_{r1}\sin(2\pi f_1 t)$, it can be sampled nonuniformly at the Kalman Filter update times $T_n$ so that $r(T_n)=\omega_{r1}\sin(2\pi f_1 T_n)$ which represents the momentum wheel output at the Kalman Filter update times. At time $T_n$, the yaw rate can be corrected by adding the sampled momentum wheel rate filter output, $$\omega_s(T_n) = \omega_{s0} + \frac{J_r}{J_{sz}} r(T_n) \qquad (4)$$

At time $T_{n+1}$, $$\omega_s(T_{n+1}) = \omega_{s0} + \frac{J_r}{J_{sz}} r(T_{n+1}) \qquad (5)$$

The change in yaw rate at time $T_{n+1}$ is found by subtracting equation (4) from equation (5), $\Delta\omega_s(T_{n+1})=\omega_s(T_{n+1})-\omega_s(T_n)$ which, by substituting the momentum wheel filter output, provides an expression for the yaw rate correction to be applied at time $T_{n+1}$ to the existing yaw rate model:

$$\Delta\omega_s(T_{n+1}) = \frac{J_r}{J_{sz}}[r(T_{n+1}) - r(T_n)] \qquad (6)$$

When the above correction is first applied at start-up, there will an error because the initial value of $r(T_n)$ is not known. the error can, however, be quickly nullified by adjusting the initial covariance element for the yaw rate state in the existing attitude determining Kalman Filter.

SATELLITE YAW MODEL

Correcting the satellite yaw rate model only will provide a great improvement over the existing model. Further improvements, however, can be obtained by also correcting the satellite yaw model. By integrating equation (3) from one Kalman Filter update time to the next, the expression for the satellite yaw can be written as $$\theta_s(T_{n+1}) - \theta_s(T_n) = \int_{T_n}^{T_{n+1}} \omega_s(t)\,dt + \int_{T_n}^{T_{n+1}} \left[\omega_{s0} + \frac{J_r}{J_{sz}}\omega_{rl}\sin(2\pi f_1 t)\right] dt$$

which, after performing the integration and rearranging, $$\theta_s(T_{n+1}) = \qquad (7)$$
$$\theta_s(T_n) + \omega_{s0}[T_{n+1} - T_n] + \frac{J_r}{J_{sz}}\frac{\omega_{rl}}{2\pi f_1}[-\cos(2\pi f_1 T_{n+1}) + \cos(2\pi f_1 T_n)]$$

Integrating the momentum wheel filter output, r(t), gives the momentum wheel position, R(t):

$$R(t) = \int_{T_n}^{T_{n+1}} r(t)\,dt = \frac{\omega_{rl}}{2\pi f_1}[-\cos(2\pi f_1 T_{n+1}) + \cos(2\pi f_1 T_n)].$$

Therefore, $R(t)=R(T_{n+1})-R(T_n)$ (8)

Substituting equation (8) into equation (7) gives the expression for the satellite yaw as a function of the momentum wheel position filter:

$$\theta_s(T_{n+1}) = \theta_s(T_n) + \omega_{s0}[T_{n+1} - T_n] + \frac{J_r}{J_{sz}}[R(T_{n+1}) - R(T_n)].$$

Next, the momentum wheel rate filter output, r(t), is substituted in equation (3) for $\omega_{r1}\sin(2\pi f_1 t)$ and the result integrated over the same time interval, $$\hat{\theta}_s(T_{n+1}) - \theta_s(T_n) = \int_{T_n}^{T_{n+1}} \hat{\omega}_s(t)\,dt = \int_{T_n}^{T_{n+1}} \left[\omega_{s0} + \frac{J_r}{J_{sz}} r(t)\right] dt \qquad (9)$$

where $\hat{\omega}$ is the computed satellite yaw rate corrected for momentum wheel rate changes at the Kalman Filter update times using the momentum wheel rate filter. Since r(t) is sampled at each $T_n$ and held constant until the next sample, $$\hat{\theta}_s(T_{n+1}) - \theta_s(T_n) = \int_{T_n}^{T_{n+1}} \left[\omega_{s0} + \frac{J_r}{J_{sz}} r(T_n)\right] dt, \qquad (10)$$

so $$\hat{\theta}_s(T_{n+1}) = \theta_s(T_n) + \omega_{s0}[T_{n+1} - T_n] + \frac{J_r}{J_{sz}} r(T_n)[T_{n+1} - T_n]$$

Subtracting equation (10) from equation (9) gives the correction to be applied to the satellite yaw at time $T_{n+1}$:

$$\Delta\theta_s(T_{n+1}) = \frac{J_r}{J_{sz}}\{[R(T_{n+1}) - R(T_n)] - r(T_n)[T_{n+1} - T_n]\} \qquad (11)$$

Equations (6) and (11) are the attitude model state corrections for the yaw rate, $\omega_s$, and the yaw, $\theta_s$.

Before discussing the implementation of the momentum wheel filter, some exemplary magnitudes of the parameters involved will be discussed. The following examples are for illustration only and other parameters values can be adapted by those of ordinary skill in the art to the invention as explained.

The momentum wheel and its associated on-board electronics emit a pulse every rotation of the satellite. Alternatively, the pulse may be divided by some integer, e.g., four, before transmitting on the down-link so each pulse would be equivalent to four revolutions of the satellite. On the down-link, a time tag denotes a bit address within the link. In designing the filter, consideration must be given to the low signal level for the momentum wheel velocity variations and the quantizing noise resulting from time tagging the tachometer pulse.

A representative error signal for the momentum wheel angular velocity is shown in FIG. 2. The error may be considered as superimposed on a constant rate of 850 radians per second. Assuming the pulses are divided by four, the tachometer pulses are emitted at $$\frac{850}{4 \times 2\pi} \approx 34$$

pulses/second. The tachometer pulse period is therefore about 30 milliseconds.

If the down-link transmission rate is 1,024,000 bits per second at 977 nanoseconds per bit, then the quantizing error is the ratio of one bit to the tachometer pulse period. Quantitatively, $$\frac{977 \times 10^{-9}}{30 \times 10^{-3}} \approx 33$$

parts/million.

In FIG. 2, the error signal has an amplitude on the order of 1/10 radians per second superimposed on the 850 radians per second constant rate. That is, $$\frac{0.1}{850} = 118$$

parts/million.

Figure 5:
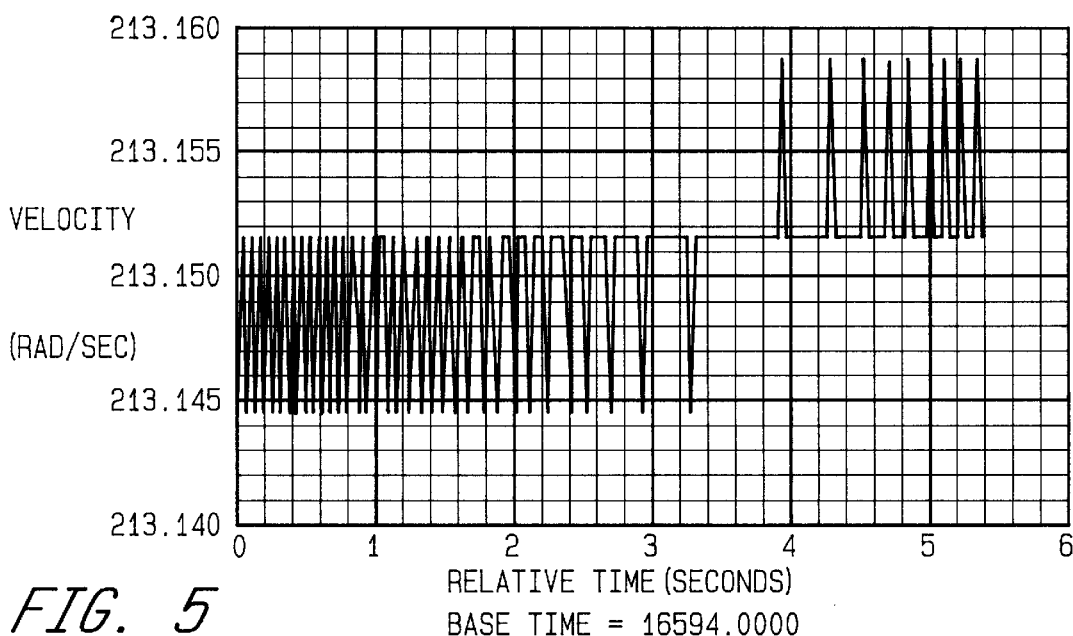
FIG. 5 is a graphical representation of a raw return of a momentum wheel tachometer signal.

The closeness of the quantization level to the signal level indicates that the desired signal will be corrupted by quantization noise. FIG. 5 is a representative example of the unfiltered momentum wheel tachometer signal before being divided by four. It can be seen that the quantization noise contains frequencies much higher than the base frequency, $f_1$, of the momentum wheel rate variations.

MOMENTUM WHEEL RATE FILTER

The momentum wheel filter will be implemented as a digital filter according to the following considerations. First, the filter must display substantially zero phase delay over the pass band. A practical specification is ±5% for the frequency range from $f_1/2$ to $2f_1$ and ±10% for the frequency range from $f_1/10$ to $f_1/2$. Phase delays create serious amplitude distortion in the filtered output signal which is proportional to the sine of the phase angle measured in radians. The effect of a phase delay in the momentum wheel rate signal on the yaw rate model results in an in-phase and an out-of-phase error, viz., $$\sin(2\pi f_1 t + \phi) = \sin\phi \cos(2\pi f_1 t) + \cos\phi \sin(2\pi f_1 t).$$

A phase error of just 5° results in almost 9% of amplitude error 90° out of phase.

Second, the filter must operate in real time with no more than 81 milliseconds of look-ahead compensation. This consideration is based on real time processing requirements of attitude and mission data processing.

Third, the filter should have substantially unity gain over the pass band, realistically within ±5%.

Fourth, the gain at zero frequency should be −120 db to limit the error due to the constant velocity of the momentum wheel to approximately 1% of the peak, i.e., one part per million compared to the 118 parts per million discussed above.

Fifth, the gain at one-tenth the pulse frequency is set to −80 db to remove the quantization noise. The pulse frequency is taken to be about 8.5 pulses per second.

Sixth, the band width should be at least $f_1/10$ to $2f_1$ to allow a reasonably wide range of amplitude and frequency modulation of $f_1$ as described above. The asymmetry is due in general to frequency $f_1$ being lower at higher amplitudes.

The first and second considerations indicate the use of an infinite impulse response (IIR) digital filter. Although a finite impulse response filter has the advantage of linear phase, it would require more than 81 milliseconds look-ahead compensation at a reasonable sample rate.

One implementation of the invention can realize a continuous filter. The data from the satellite, however, is already digitized and a digital implementation can be more flexible in changes to the system parameters and the output from the Kalman Filter used to process the yaw rate and yaw values also supplies results in digital format. Therefore, a digital filter implementation is preferred in the present application. There are, however, situations in which the continuous analog implementation may be preferable and such an implementation is within the ordinary skill of the art given the teachings of the invention.

Digital filters are based on the z-transform function which is a rational function in z for infinite impulse response filters. In addition to the quantization limitation mentioned above, digital filters also suffer from round-off errors due to the finite word (register) length of the magnitude representations in digital formats.

The transfer function of a digital filter is given by $$H(z) = \frac{\sum_{i=0}^{m} a_i z^{-i}}{1 + \sum_{j=0}^{n} b_j z^{-j}}.$$

An infinite impulse filter is recursive because at least one $b_j$ is not zero.

The general convolutional summation of a digital filter is $$r_n = \sum_{i=-\infty}^{\infty} u_i h_{n-i}$$

where the $r_n$ are the output signals, the $u_i$ are the input signals, and where the impulse response set $\{h_n\}$ of the system has an infinite number of terms in an infinite impulse response filter.

Another representation of linear, time-invariant discrete-time filter systems is the linear constant coefficient difference equation, $$r_n = \sum_{i=0}^{n} a_i u_{n-k} - \sum_{j=1}^{m} b_k r_{n-j}.$$

For any $b \neq 0$, the output depends on at least one previous output, making the system recursive.

Computer programs are available to design digital filters but the approach here will be first to design a continuous filter and then convert to a digital form which is more suitable for a digital computer implementation.

DESIGN OF CONTINUOUS FILTER

A suitable continuous filter LaPlace transform is a cascade form found to be, with $\mathcal{L}[r(t)] = R(s)$ and $\mathcal{L}[u(t)] = U(s)$, $$\frac{R(s)}{U(s)} = \frac{s}{s + 0.01(2\pi f_1)} \cdot \frac{(20\pi f_1)^2}{s^2 + \zeta_1(20\pi f_1) + (20\pi f_1)^2} \cdot \frac{(20\pi f_1)^2}{s^2 + \zeta_2(20\pi f_1) + (20\pi f_1)^2}$$

where $$\zeta_1 = -2\cos\frac{5\pi}{8}$$

and $$\zeta_2 = -2\cos\frac{7\pi}{8}.$$

The first factor $R(s)/U(s)$ provides the suppression at zero frequency with a zero at the origin and a pole well below the low end of the pass band. The second and third factors in combination comprise a fourth-order Butterworth low-pass filter with a cutoff frequency at the high end of the band pass. The low frequency pole can cause long term transients in the output that will have negligible effect in the momentum wheel model. Any slowly varying components are removed by the existing attitude filter.

Although the magnitude response requirements are met by the above transfer function, the phase requirement has not. To improve the design according to the given considerations, the frequency at the high end of the pass band is doubled and a phase lead compensator is added to reduce the phase lag at the high end of the pass band. A suitable compensator is $$G(s) = \frac{f_{c2}}{f_{c1}} \frac{s + 2\pi f_{c1}}{s + 2\pi f_{c2}}.$$

The high end of the band must be increased to move the magnitude distortion of the lead compensator out of the band pass region of the filter. Therefore, $f_{c1} = 4.21\ f_1$ and
$f_{c2} = 8.41\ f_1$.

The cascaded form of the filter is, therefore, $$\frac{R(s)}{U(s)} = G_1(s)G_2(s)G_3(s)G_4(s) \tag{12}$$

where $$G_1 = \frac{s}{s + 0.01(2\pi f_1)},$$

$$G_2 = \frac{(40\pi f_1)^2}{S^2 - 2\cos\frac{5\pi}{8}(40\pi f_1) + (40\pi f_1)^2},$$

$$G_3 = \frac{(40\pi f_1)^2}{S^2 - 2\cos\frac{7\pi}{8}(40\pi f_1) + (40\pi f_1)6^2}, \text{ and}$$

$$G_4 = \frac{f_{c2}}{f_{c1}} s + \frac{2\pi f_{c1}}{s + 2\pi f_{c2}}, \text{ the compensator.}$$

This filter has a design restriction that the input signal should not contain any significant energy between 0.1 Hz to 1 Hz. Otherwise, severe amplitude and phase distortion will result in this range. Under normal circumstances, the conditions under which the filter is used does not contain such energies.

CONVERSION TO A DIGITAL FILTER

To convert the continuous filter of equation (12) to a digital implementation, the well-known Bilinear Transformation is used by substituting $$s \leftarrow \frac{2}{T} \frac{1 - z^{-1}}{1 + z^{-1}}$$

where T is the sampling period. Since this transformation maps the entire $j\omega$ axis in the s-plane onto the unit circle in the z-plane, the frequency values in the continuous transfer function must be warped using $$\Omega = \frac{2}{T} \tan\left(\frac{2\pi f T}{2}\right).$$

The warped frequency version of equation (12) is, therefore, $$\frac{R(s)}{U(s)} = \frac{s}{s + \Omega_1} \frac{\Omega_2^2}{s^2 - 4\cos\frac{5\pi}{8}\Omega_2 + \Omega_2^2} \tag{13}$$

$$\frac{\Omega_3^2}{s^2 - 4\cos\frac{7\pi}{8}\Omega_2 + \Omega_2^2} \frac{\frac{f_{c2}}{f_{c1}} s + \Omega_3}{s + \Omega_4}$$

where $$\Omega_1 = \frac{2}{T} \tan\left(\frac{0.01(2\pi f_1)T}{2}\right),$$

$$\Omega_2 = \frac{2}{T}\left(\frac{40\pi f_1 T}{2}\right),$$

$$\Omega_3 = \frac{2}{T} \tan\left(\frac{2\pi f_{c1} T}{2}\right), \text{ and}$$

$$\Omega_4 = \frac{2}{T} \tan\left(\frac{2\pi f_{c2} T}{2}\right).$$

Applying the bilinear transform to each factor in equation (13) will put the filter in discrete form, $$\frac{R(z)}{U(z)} = G_1(z)G_2(z)G_3(z)G_4(z) \text{ so that}$$

$$G_1(z) = \frac{\frac{2}{T}(1 - z^{-1})}{\left(\Omega_1 + \frac{2}{T}\right) + \left(\Omega_1 - \frac{2}{T}\right)z^{-1}},$$

$$G_2(z) = \frac{\frac{T^2 \Omega_2^2}{4}(1 + 2z^{-1} + z^{-2})}{\left(\frac{T^2 \Omega_2^2}{4} - 2T\cos\frac{5\pi}{8}\Omega_2 + 1\right) + 2\left(\frac{T^2 \Omega_2^2}{4} - 1\right)z^{-1} + \left(\frac{T^2 \Omega_2^2}{4} + 2T\cos\frac{5\pi}{8}\Omega_2 + 1\right)z^{-2}},$$

$$G_3(z) = \frac{\frac{T^2 \Omega_2^2}{4}(1 + 2z^{-1} + z^{-2})}{\left(\frac{T^2 \Omega_2^2}{4} - 2T\cos\frac{7\pi}{8}\Omega_2 + 1\right) + 2\left(\frac{T^2 \Omega_2^2}{4} - 1\right)z^{-1} + \left(\frac{T^2 \Omega_2^2}{4} + 2T\cos\frac{7\pi}{8}\Omega_2 + 1\right)z^{-2}},$$

and $$G_4(z) = \frac{\left(\Omega_3 + \frac{2}{T}\right) + \left(\Omega_3 - \frac{2}{T}\right)z^{-1}}{\left(\Omega_4 + \frac{2}{T}\right) + \left(\Omega_4 - \frac{2}{T}\right)z^{-1}}.$$

The G(z) equations can be implemented by programming a digital computer. The implementations for computation will next be derived. Since many of the variables in the above equations are established by the design of the system, they can be precalculated, typically at compile time, to reduce the programming running time during on-line operation.

For $G_1(z)$, the following precalculations can be made:
$P=2/T$,
$b_0=\Omega_1+P$, and
$b_1=\Omega_1-P$.
$G_1(z)$ can then be written as $$\frac{R_1(z)}{U_1(z)} = \frac{P(1-z^{-1})}{b_0 + b_1 z^{-1}}$$

and, cross multiplying and rearranging, $$R_1(z) = \frac{P}{b_0}[U_1(z) - z^{-1}U_1(z)] - \frac{b_1}{b_0}z^{-1}R_1(z).$$

Taking the inverse z-transform, $$r_1(n) = \frac{P}{b_0}[u_1(n) - u_1(n-1)] - \frac{b_1}{b_0}r_1(n-1) \quad (14)$$

Thus, the current n-th sample, $r_1(n)$, is a function of the current input, $u1(n)$, the previous input, $u_1(n-1)$, and the previous output, $r_1(n-1)$.

For $G_2(z)$, the following precalculations can be made:

$$K = \frac{T^2 \Omega_2^2}{4},$$

$$a_{01} = (K+1) - 2T\cos\frac{\pi}{8},$$

$$a_1 = 2(K+1), \text{ and}$$

$$a_{21} = (K+1) + 2T\cos\frac{5\pi}{8}.$$

The simplified form for $G_2(z)$ by substituting the precalculated values is $$G_2(z) = \frac{R_2(z)}{U_2(z)} = \frac{K(1 + 2z^{-1} + z^{-2})}{a_{01} + a_1 z^{-1} + a_{21} z^{-2}}.$$

Cross multiplying and solving for $R_2(z)$ gives $R_2(z) =$ $$\frac{K}{a_{01}}[U_2(z) + 2z^{-1}U_2(z) + z^{-2}U_2(z)] - \frac{1}{a_{01}}[a_1 z^{-1} R_2(z) + a_{21} z^{-2} R_2(z)].$$

Taking the inverse z-transform of $R_2(z)$, the sampled time function is found to be $$r_2(n) = \frac{K}{a_{01}}[u_2(n) + 2u_2(n-1) + u_2(n-2)] - \quad (15)$$

$$\frac{1}{a_{01}}[a_1 r_2(n-1) + a_{21} r_2(n-2)]$$

The implementation of the equation for $G_3(z)$ is the same as that for $G_2(z)$ except that $a_{01}$ is replaced by $$a_{02} = (K+1) - 2T\cos\frac{7\pi}{8}$$

and $a_{21}$ is replaced by $$a_{22} = (K+1) + 2T\cos\frac{7\pi}{8}.$$

Therefore, $$r_3(n) = \frac{K}{a_{02}}[u_2(n) + 2u_2(n-1) + u_2(n-2)] - \quad (16)$$

$$\frac{1}{a_{02}}[a_1 r_2(n-1) + a_{22} r_2(n-2)]$$

Equations (15) and (16) show the output signals to be linear combinations of the current and two previous two input signals and the previous two output signals.

The compensator, $G_4(z)$ is implemented by precalculating $$f_0 = \Omega_3 + P, f_1 = \Omega_3 - P, g_0 = \Omega_4 + P,$$

and $g_1 = \Omega_4 - P$ so that $$\frac{R_4(z)}{U_4(z)} = \frac{f_0 + f_1 z^{-1}}{g_0 + g_1 z^{-1}} \text{ and}$$

$$R_4(z) = \frac{f_0}{g_0}U_4(z) + \frac{f_1}{g_0}z^{-1}U_4(z) - \frac{g_1}{g_0}z^{-1}R_4(z).$$

The inverse transform is $$r_4(n) = \frac{f_0}{g_0}u_4(n) + \frac{f_1}{g_0}u_4(n-1) - \frac{g_1}{g_0}r_4(n-1) \quad (17)$$

Each output term $R_n$ becomes the input term $U_{n+1}$ for the next section. $U_1 \rightarrow R_1 = U_2 \rightarrow R_2 = U_3 \rightarrow R_3 = U_4 \rightarrow R_4$, where $\rightarrow$ is interpreted as "is transformed to".

POSITION INTEGRATOR

After finding $r(T_n)$, the filtered yaw rate, the yaw (position) $R(T_n)$ is found by integration. Digital integration can be accomplished using the trapezoidal rule. It can be implemented using the $\mathcal{S}$-domain relation $$R(z) = \frac{T}{2}[U(z) + U(z)z^{-1}] + R(z)z^{-1}$$

as $$R(T_n) = \frac{T}{2}[r(n) + r(n-1)] + R(n-1).$$

The same or equivalent result is obtained by expanding the inverse of the Bilinear Transform, i.e., multiplying a transform by $$\frac{1}{S} = \frac{T}{2}\frac{1+z^{-1}}{1-z^{-1}}$$

is the equivalent of integrating the inverse transform.

Figure 6:
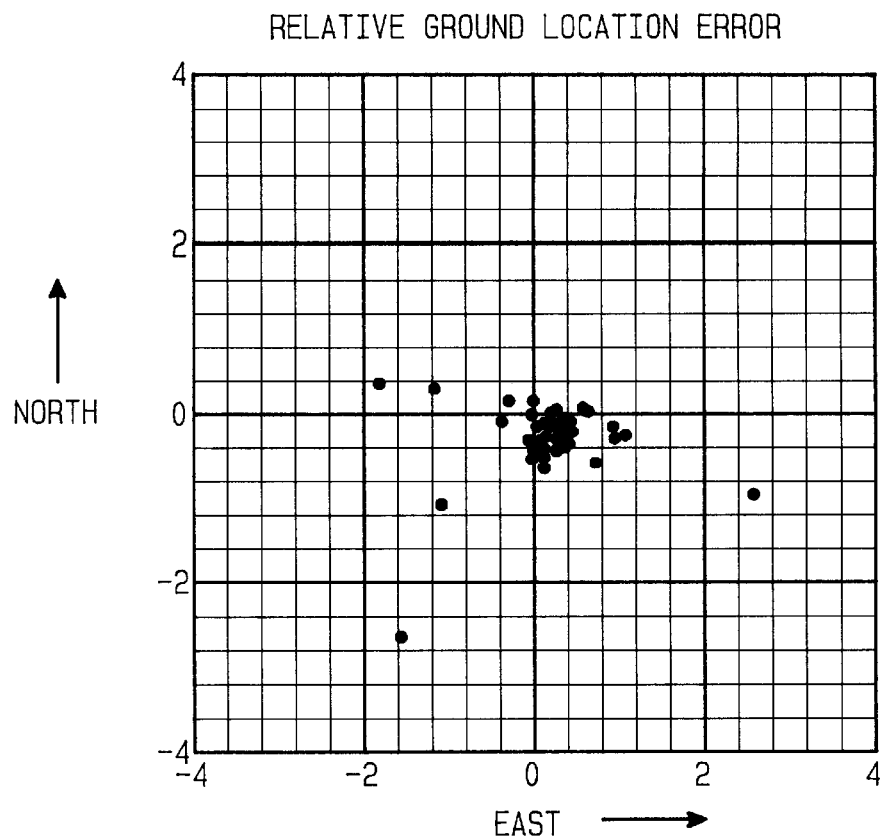
FIG. 6 is a diagram showing the location scatter of an observation signals without the invention.
Figure 7:
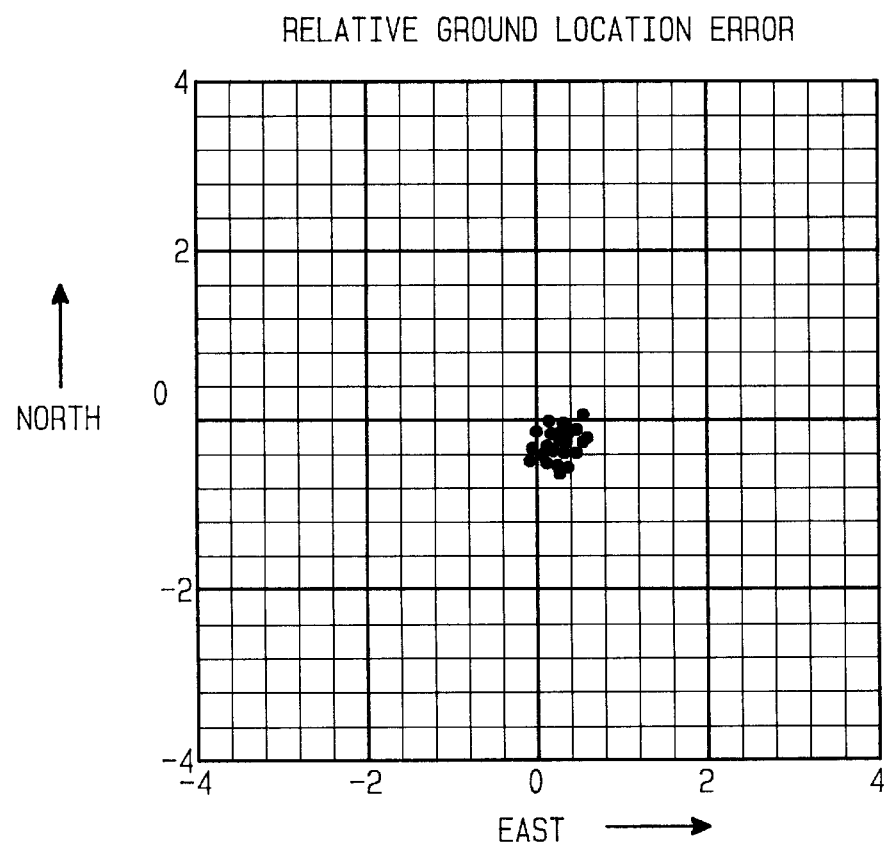
FIG. 7 is a diagram showing the location scatter of the same observation signal shown in FIG. 6 using the invention.

FIG. 6 is a scatter diagram showing the spread of target positions without incorporation of the system according to the invention. FIG. 7 is a scatter diagram showing the spread in the same target data when the invention is incorporated. The improvement in the accuracy of target determination is clearly apparent.

Figure 8:
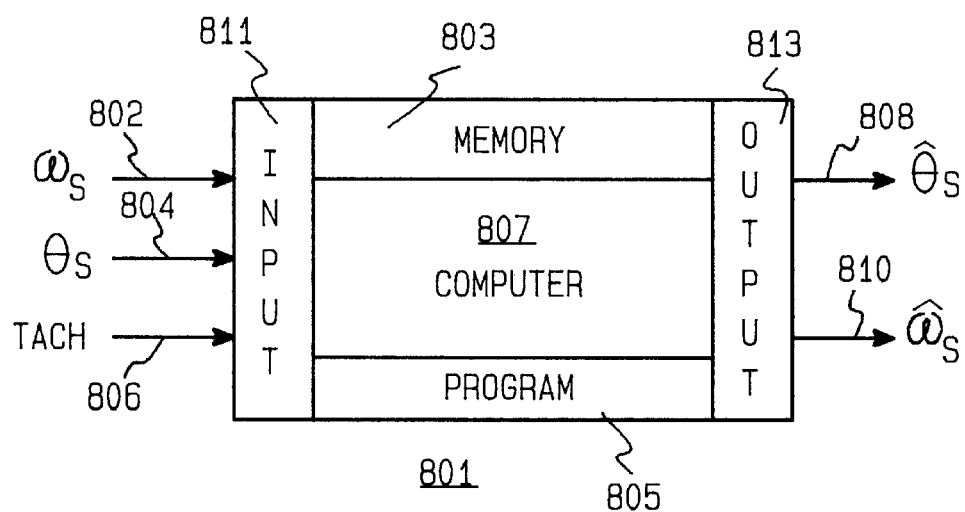
FIG. 8 is a block diagram of a computer system on which the invention can be practiced.

FIG. 8 is a block diagram of a computer implementating the invention. The computer system 801 includes a memory for storing data 803 and programs 805. Also included are input ports 811 and output ports 813.

The calculated (or determined) satellite attitude subvector, i.e., the yaw rate $\omega_s$ s and the yaw $\theta_s$ are coupled into the input ports 811 via lines 802 and 804. The values are commonly stored in the memory 803. Also, the tachometer signals TACH are coupled on the input ports 811. Several constants used in the filter computations as well as the input data are stored in the memory 803.

A computer 807 includes registers and a arithmetic-logic unit for executing a sequence of instructions stored in the program memory 805. (The data memory 803 and the program memory 805 may occupy contiguous storage locations.) The instruction sequence in the program memory 805 is characterized by the pseudo-code disclosed below.

As data is received at the input ports 811, the computer 807 processes the information to compute a set of correction values which are applied to the satellite attitude state subvector $$\begin{pmatrix} \theta_s \\ \omega_s \end{pmatrix}$$

to supply a corrected satellite attitude state subvector $$\begin{pmatrix} \hat{\theta}_s \\ \hat{\omega}_s \end{pmatrix}.$$

PROGRAM PSEUDO-CODE IN OUTLINE FORMAT
I. Housekeeping and Set-up
  A. Initialize Constants 1. $P = \dfrac{2}{T}$ 2. $b_0 = \Omega_1 + P$ 3. $b_1 = \Omega_1 - P$ 4. $k_{11} = \dfrac{P}{b_0}$ 5. $k_{12} = \dfrac{b_1}{b_0}$ 6. $K = \dfrac{T^2 \Omega_2^2}{4}$ 7. $a_{01} = (K+1) - 2T\cos\dfrac{5\pi}{8}$ 8. $k_{21} = \dfrac{K}{a_{01}}$ 9. $k_{22} = \dfrac{1}{a_{01}}$ 10. $a_1 = 2(K+1)$ 11. $a_{21} = (K+1) + 2T\cos\dfrac{5\pi}{8}$ 12. $a_{02} = (K+1) - 2T\cos\dfrac{7\pi}{8}$ 13. $k_{31} = \dfrac{K}{a_{02}}$ 14. $k_{32} = \dfrac{1}{a_{02}}$ 15. $a_{22} = (K+1) + 2T\cos\dfrac{7\pi}{8}$ 16. $f_0 = \Omega_3 + P$ 17. $f_1 = \Omega_3 - P$ 18. $g_0 = \Omega_4 + P$ 19. $g_1 = \Omega_4 - P$ 20. $k_{41} = \dfrac{f_0}{g_0}$ 21. $k_{42} = \dfrac{f_1}{g_0}$ 22. $k_{43} = \dfrac{g_1}{g_0}$ B. Initialize Index n=0
  C. Initialize Input Samples
    1. $u_1(n-1)=0$
    2. $u_2(n-1)=u_2(n-2)=0$
    3. $u_3(n-1)=u_3(n-2)=0$
    4. $u_4(n-1)=0$
  D. Initialize Earlier Output Values
    1. $r_1(n-1)=0$
    2. $r_2(n-1)=r_2(n-2)=0$
    3. $r_3(n-1)=r_3(n-2)=0$
    4. $r_4(n-1)=0$
    5. $R(n-1)=0$
II. Begin Compute Loop
  A. Input Determined Attitude State Subvector
    1. Read $\theta_s$
    2. Read $\omega_s$
  B. Input First Sample Value
    1. Read $u_1(n)$
  C. Compute Filter Section Outputs
    1. $r_1(n)=k_{11}[u_1(n)+2u_1(n-1)]-k_{12}r_1(n-1)$
    2. $u_2(n)=r_1(n)$ 3. $r_2(n)=k_{21}[u_2(n)+2u_2(n-1)+u_2(n-2)]-k_{22}[a_1r_2(n-1)+a_{21}r_2(n-2)]$
4. $u_3(n)=r_2(n)$
5. $r_3(n)=k_{31}[u_2(n)+2u_3(n-1)+u_3(n-2)]-k_{32}[a_1r_3(n-1)+a_{31}r_3(n-2)]$
6. $u_4(n)=r_3(n)$
7. $r_4=k_{41}u_4(n)+k_{42}u_4(n-1)-k_{43}r_4(n-1)$ D. Shift Input Values
1. $u_2(n-2)=u_2(n-1)$
2. $u_1(n-1)=u_1(n)$
3. $u_3(n-2)=u_3(n-1)$
4. $u_2(n-1)=u_2(n)$
5. $u_4(n-1)=u_4(n)$
6. $u_3(n-1)=u_3(n)$ E. Shift Output Values
1. $r_2(n-2)=r_2(n-1)$
2. $r_1(n-1)=r_1(n)$
3. $r_3(n-2)=r_3(n-1)$
4. $r_2(n-1)=r_2(n)$
5. $r_4(n-1)=r_4(n)$
6. $r_3(n-1)=r_3(n)$ F. Integrate r(n) to Calculate R(n)

1. $R(n) = \frac{T}{2}[r(n) + r(n-1)] + R(n-1)$

2. $R(n-1)=R(n)$

G. Correct Attitude State Subvector
1. $\hat{\theta}_s=\theta_s+\Delta\theta_s(T_n)$—see equation (11)
2. $\hat{\omega}_s=\omega_s+\Delta\omega_s(T_n)$—see equation (6)

H. Output Corrected Attitude State Subvector
1. Write $\hat{\theta}_s$
2. Write $\hat{\omega}_s$ III. Go to II and Compute Next Sample While the invention has been particularly shown and described with reference to a preferred embodiment thereof, it will be understood by those skilled in the art that various changes and modifications in form and details may be made therein without departing from the spirit and scope of the invention according to the following claims.

What is claimed is:

1. In a spacecraft having momentum wheel means, a combination comprising:
   sensor means for supplying spacecraft attitude state vectors;
   follower means for supplying signals indicative of motion of the momentum wheel;
   observer means responsive to signals from the sensor means for supplying yaw rate signals indicative of the spacecraft yaw rate and yaw signals indicative of spacecraft yaw;
   detector means responsive to the signals from the follower means for supplying signals representative of variations in the rate of rotation of the momentum wheel;
   means for applying signals from the detector means to the signals from the observer means for correcting indicated spacecraft yaw rate.

2. The combination of claim 1 wherein said follower means comprises a tachometer means.

3. The combination of claim 1 wherein said observer means comprises a Kalman filter.

4. The combination of claim 1 wherein said detector means comprises a filter means.

5. The combination of claim 4 wherein said filter means is a digital filter means.

6. The combination of claim 1 further including
   means for applying signals from the detector means to the observer means for correcting indicated spacecraft yaw.

7. A programmable apparatus for correcting velocity variation errors in an on-board momentum wheel that are coupled into the spin rate of an orbiting space vehicle comprising, in combination:
   tachometer means coupled to the momentum wheel for supplying signals representative of the motion of the momentum wheel;
   means for determining space vehicle attitude values;
   program execution means receptive of signals from the determining means representing space vehicle attitude values such as space vehicle yaw and yaw rate, and the tachometer means representing values of the motion of the momentum wheel; and
   control program means including
      means for modeling a filter that passes a band of frequencies which includes error-producing fluctuations in the momentum wheel's angular velocity for producing values representative of the magnitude of errors in the angular velocity of the momentum wheel,
      means for applying values from the modeling means to the space vehicle determined yaw rate values, and
      means for outputting from the applying means a corrected space vehicle yaw rate value;
   whereby errors in the determined yaw rate of the space vehicle caused by momentum wheel errors are eliminated or substantially reduced.

8. The combination claimed in claim 9 wherein said control program means further including:
   means for integrating values representative of the magnitude of errors in the angular velocity of the momentum wheel to produce values representative of errors in determined space vehicle yaw; and
   second means for applying the values representative of errors in determined space vehicle yaw to the determined space vehicle determined yaw;
   whereby errors in the determined yaw rate of the space vehicle caused by momentum wheel errors are eliminated or substantially reduced.

9. A machine implemented process for correcting momentum wheel velocity variation errors that are coupled into the spin rate of an orbiting space vehicle comprising the steps of:
   supplying signals representative of the motion of the momentum wheel;
   determining spacecraft attitude values; and
   executing a program receptive of the spacecraft attitude values and the motion of the momentum wheel to model a filter that passes a band of frequencies which includes error-producing fluctuations in the momentum wheel motion for producing values representative of the magnitude of errors in the momentum wheel's motion,
   whereby errors in the determined yaw rate of the space vehicle caused by momentum wheel errors are eliminated or substantially reduced.

10. The machine implemented process claimed in claim 9 including the further steps of:
   integrating values representative of the magnitude of errors in the angular velocity of the momentum wheel to produce values representative of errors in determined space vehicle yaw; and applying the values representative of errors in determined space vehicle yaw to the determined space vehicle determined yaw;

whereby errors in the determined yaw rate of the space vehicle caused by momentum wheel errors are eliminated or substantially reduced.

* * * * *